Patented Aug. 11, 1936

2,050,444

UNITED STATES PATENT OFFICE 2,050,444

METHOD OF PRODUCING ISOPROPYL ALCOHOL

Floyd J. Metzger, New York, N. Y., assignor to Air Reduction Company, Inc., New York, N. Y., a corporation of New York No Drawing. Application January 4, 1934, Serial No. 705,235

REISSUED

18 Claims. (Cl. 260—156)

This invention relates to the production of isopropyl alcohol from propylene.

It is known that isopropyl alcohol can be manufactured from propylene by absorbing the propylene in strong sulfuric acid, diluting with water, distilling the resulting isopropyl alcohol from a diluted mixture, and reconcentrating the dilute acid for further use in the process. This process involves a series of separate and successive operations carried out in different apparatus. The reconcentration of the dilute acid is a major expense of the process. The formation of isopropyl alcohol in this way is usually accompanied by the formation of a considerable amount of other products, with corresponding reduction in the amount of alcohol produced.

The present invention provides an improved method for the manufacture of isopropyl alcohol which enables the objections above mentioned to be largely overcome and minimized, which eliminates the necessity of using strong sulfuric acid and of reconcentrating dilute acid, which can be carried out in a continuous manner, and which has other advantages, such as those hereinafter set forth.

According to the process of the present invention the isopropyl alcohol is produced continuously by passing the propylene in admixture with suitable proportions of steam, into intimate contact with an acid catalyst, and particularly a sulfuric acid catalyst, while maintaining the catalyst at a high temperature, and advantageously maintaining the acid and the gases under a high pressure, with resulting conversion of the propylene into isopropyl alcohol which is subsequently condensed along with the excess steam from the escaping gases.

I have found that isopropyl alcohol can readily be produced in a continuous manner by passing a preformed mixture of propylene and steam, in suitable proportions, into intimate contact with a relatively dilute sulfuric acid catalyst at a relatively high temperature, and advantageously under a high pressure, with resulting formation of a gaseous mixture containing the isopropyl alcohol together with the excess of propylene and steam, from which the isopropyl alcohol and steam can be readily condensed.

This conversion of propylene into isopropyl alcohol can advantageously be carried out in a cyclic manner by maintaining a circulating stream of propylene under a high pressure, admixing therewith steam in suitable proportions, passing the resulting mixture through or into contact with the acid catalyst at a high temperature, condensing the isopropyl alcohol and excess steam while maintaining the uniform temperature, and advantageously at a high pressure, and recycling the propylene with suitable further additions of propylene and steam in the further carrying out of the process.

The catalyst which I have found particularly valuable is a sulfuric acid catalyst which is a much weaker sulfuric acid than the strong acid heretofore commercially used in the manufacture of isopropyl alcohol. The sulfuric acid employed may have a strength, for example, of from 3 to about 60% by weight of sulfuric acid. Apparently the propylene combines to some extent with the acid to form propyl sulfate or propyl hydrogen sulfate so that the catalyst may be a mixture of sulfuric acid and alkyl sulfate. The strength of the acid is maintained substantially constant at the high temperature and under the pressure employed by using regulated proportions of propylene and steam in the gaseous mixture passed through or into intimate contact with the acid catalyst.

The temperatures employed in the present process will vary with the strength of the acid catalyst, with the pressure and with the ratio of steam to propylene employed. By passing the mixture of steam and propylene in contact with the dilute sulfuric acid catalyst under a high pressure it is possible to use a much higher temperature than is possible at atmospheric pressure with a dilute acid, and a much more dilute acid catalyst than can be used at atmospheric pressure. Using a sulfuric acid catalyst, without promoters, and with mixtures of steam and propylene, the temperatures are in general in excess of about 130° C., and, for best results, and particularly with high pressures, temperatures up to 200° C. or higher are used, and in some cases temperatures as high as 250° C. or higher. The temperature, however, cannot be varied independently of the other conditions because the temperature, pressure, acid strength and ratio of steam and propylene are interdependent. With the same acid strength and the same ratio of steam and propylene, the temperature can be very considerably increased by carrying out the process under a high pressure, and the increased temperature seems to have the effect of greatly increasing the activity of the dilute acid catalyst and of promoting the formation of alcohol.

By properly regulating the proportion of propylene and steam, and using a suitable acid strength and temperature, it is possible to produce isopropyl alcohol continuously at atmospheric pressure, but the acid strength used at atmospheric pressure is relatively high, and the temperature is relatively low, as compared with the acid strength and temperature which can be more advantageously used by operating under a high pressure, for example, a pressure in excess of 100 pounds, or even much higher pressures, such as pressures around 200 pounds or higher and even up to pressures around 600 to 1000 pounds or higher with more dilute acid catalysts which can be maintained at high temperatures under such high pressures. With the higher pressures, there should be a proper correlation of the strength of the acid catalyst, the temperature and the proportion of steam and propylene. With such high pressures it is possible to use temperatures much higher than it is possible to use at atmospheric pressure and a much more dilute sulfuric acid catalyst than can be used at atmospheric pressure. The combined use of high temperature and pressure with a relatively dilute acid catalyst makes it possible to produce isopropyl alcohol in commercial quantities in a particularly advantageous manner.

The proportions of steam and propylene can be varied but in general for the production of isopropyl alcohol free or relatively free from propyl ether, it is advantageous to use an excess of steam over that theoretically required for combining with the propylene, or an amount of steam at least equal to that theoretically required, for example, equal proportions of steam and propylene, or a ratio of one and one-half parts of steam to one of propylene, or even higher ratios. Lower ratios of steam to propylene can be used, particularly where the production of propyl ether as well as alcohol is desired, e. g. down to about 25 parts of steam to 75 of propylene.

When a constant mixture of steam and propylene is passed through or in intimate contact with the dilute acid catalyst, under a high temperature and pressure, the strength of the acid catalyst will reach an equilibrium and will thereafter remain at the equilibrium strength as long as the conditions of the process, i. e. the temperature, pressure and ratio of steam to propylene remain constant; but the equilibrium reached will represent a much more dilute acid than that which would represent the equilibrium at the same temperature and at atmospheric pressure.

The propylene employed in the process may be obtained from any suitable source, such as liquefaction and rectification of the gases produced from oil or gas cracking operations. Pure or relatively pure propylene can readily be produced, and when produced or available can be used in the process. Instead of using the pure propylene, the impure hydrocarbon can be used admixed with other gases or vapors which are unobjectionable in the process, such as saturated hydrocarbon vapors which are not changed during the process, or other inert gases or vapors.

Where the propylene employed in the process is impure, it will be evident that the extent to which it can be recycled, when the process is carried out with recycling, will be limited by the building up of impurities or of inert gases or vapors or by the formation of undesirable reaction products therefrom, in which the gas after one or more passages through the converter should not be further cycled or should be purified, or a constant discharge of the recycling gases should be effected, to maintain the recycling gases of sufficient purity.

The steam employed in the process can be supplied from any suitable source, such as a high pressure steam boiler, and admixed with the propylene in regulated proportions. The mixture of steam and propylene can also be prepared by passing the propylene through a body of water maintained at a sufficiently high temperature and under the same pressure employed in the converter. In this case, the recirculating propylene can be passed through such a boiler containing water and the temperature of the boiler maintained to give the proper proportion of steam and propylene in the gases passing therefrom to the converter.

Instead of carrying out the process in a cyclic manner, by passing the mixture of steam and propylene through a single converter, then through a condenser, and then recirculating the propylene with admixture of steam under the same high pressure to the same converter, two or more converters can be employed in series, with or without condensation of the isopropyl alcohol and steam from the gases escaping from the first converter, then admixing additional steam or propylene or both if desired, and passing the gases through the second converter, etc.; and in such case the condensers as well as the converters are advantageously maintained under a high pressure so that condensation as well as conversion will take place under such pressure.

Instead of using a sulfuric acid catalyst, other acid catalysts can be employed, for example, a phosphoric acid catalyst, or a mixture of phosphoric and sulfuric acids. In referring to the acid catalyst I use the term to include the acid catalyst with whatever other constitutents such as alkyl sulfates it may contain during the catalytic conversion. Provision should be made for insuring intimate contact of the gases with the acid catalyst, such as the dissemination or distribution of the gases throughout the acid catalyst. Where the converter contains a considerable body of acid, the distribution of the gas and the intimate contact of the gas and acid can be promoted by suitable filling material which impedes the upward flow of the gases through the acid. The filling material should of course be of suitable acid-resistant material. Instead of using a liquid body of the acid catalyst, with passage of the gases into intimate contact therewith, the acids may be absorbed on suitable carriers such as pumice stone, silica gel, etc.

The action of the acid catalyst can be promoted by the addition thereto of certain promoters, or of certain substances which form or become promoters during the carrying out of this process. Silver or silver sulfate may be added in small amount as such a promoter, and the use of such a promoter enables the process to be carried out at somewhat lower temperatures, or with somewhat increased yields, than when promoters are not present. Lithium sulfate may also be added with beneficial results.

The apparatus employed in carrying out the process includes a converter or converter chamber containing the acid catalyst and provided with means such as a filling material distributed throughout the acid, for bringing the mixture of propylene and steam into intimate contact therewith while maintaining the catalyst and the gases under the necessary pressure and at the necessary high temperature, together with means for supplying the steam and propylene in suitable proportions and under the necessary high pressure, and a condenser for condensing the alcohol and admixed steam from the escaping gases. That part of the apparatus which comes in contact with the acid catalyst should of course be made of suitable acid resistant material, resistant to the action of the acid catalyst at the high temperatures employed.

Where the process is carried out in a cyclic manner the condenser as well as the converter is maintained under a high pressure and the unconverted propylene is recycled, additional propylene admixed therewith, and steam also admixed therewith so that provision is made for supplying both steam and additional propylene to the cycle under the necessary high pressure.

In general, the stronger acid catalyst will be employed at a lower pressure and temperature and the weaker acid catalyst at a higher temperature and pressure. For example, with acid catalysts of around 65 to 70% sulfuric acid, atmospheric pressure may be used, or a pressure somewhat above atmospheric; while materially more dilute acids can readily be employed at higher temperatures. With the stronger acids and at atmospheric pressure the temperatures may be around 130° C., while with more dilute acids and higher pressures, higher temperatures can be used.

The nature of the invention will be further illustrated by the following specific examples, but it will be understood that the invention is not limited thereto.

Approximately equal molecular proportions or volumes of propylene and steam were passed through a sulfuric acid catalyst containing about 58% sulfuric acid by weight maintained at a temperature of about 130° C. and under atmospheric pressure. The volume of admixed propylene and steam passed through the catalyst was about 68 liters per hour per liter of acid catalyst and there was obtained a conversion of around 6% or somewhat more of the propylene to isopropyl alcohol which was obtained in the form of an aqueous solution containing about 16% alcohol by cooling the gases and vapors escaping from the converter and condensing the alcohol and water vapors therefrom.

In another example of the process, the mixture of steam and propylene contained an excess of steam somewhat in excess of equal proportions and this mixture was passed in contact with a sulfuric acid catalyst containing about 27% sulfuric acid by weight, maintained at a catalytic temperature of about 200° C. and under a gauge pressure of about 250 pounds. The gases and vapors escaping from the converter, and containing the excess propylene and steam and the vapors of the isopropyl alcohol, were cooled and the isopropyl alcohol obtained in the form of a 20% aqueous solution with a percentage conversion of about 10%.

In another example of the process, the propylene and steam in about equal proportions or with an excess of steam somewhat in excess of equal proportions, were passed in contact with a sulfuric acid catalyst containing about 35% sulfuric acid by weight, maintained at a catalytic temperature of about 171° C. and at a gauge pressure of about 125 pounds. The escaping gases were cooled to condense the water vapor and alcohol vapor and a yield of about 10% of isopropyl alcohol was obtained, based upon the propylene used, in the form of an aqueous solution containing about 24% alcohol.

With increased proportions of steam to propylene, more dilute sulfuric acid solutions can be employed and at higher pressures, and with the temperature, pressure, acid strength and proportion of steam and propylene in equilibrium.

Decreased proportions of steam to propylene can also be used, particularly where the production of more or less propyl ether is desired as well as of isopropyl alcohol.

The following examples illustrate the use of a more dilute acid catalyst:

A mixture of steam and propylene (containing around 93 to 96% propylene and the remainder mainly ethylene) was passed into contact with a sulfuric acid catalyst containing around 3.5 to 5% sulfuric acid at a temperature of around 210 to 225° C. and under a gauge pressure of about 1,000 pounds, with the resulting conversion of around 10 to 13% of the propylene to isopropyl alcohol and around 3 to 4% of the propylene to propyl ether.

A mixture of about 25 parts of steam to about 75 parts of a gas made up of about 64% propylene and 36% propane was passed into contact with a dilute sulfuric acid catalyst containing around 4% sulfuric acid at a temperature of about 190 to 200° C. and at a gauge pressure of about 1,000 pounds per square inch with the resulting conversion of around 10 to 11% of the propylene to isopropyl alcohol and a conversion of about 5% of the propylene to propyl ether.

The excess steam supplied in admixture with the propylene, in excess of that which combines with the propylene to form isopropyl alcohol, will escape with the gases from the converter and will be condensed with the alcohol as aqueous alcohol, the water content of the acid remaining practically constant so long as the conditions of temperature, pressure, acid strength and proportion of steam to propylene are properly regulated with respect to each other.

By a proper coordination or correlation of the temperature, pressure, and acid catalyst, and with proper regulation of the proportion of steam to propylene, it is possible to produce isopropyl alcohol from propylene, with acid catalysts sufficiently dilute to avoid objectionable decomposition of the propylene and the objectionable formation of polymers, etc., while nevertheless employing temperatures with the dilute acid catalysts which bring about an effective conversion of propylene into isopropyl alcohol.

It will thus be seen that the present process makes use of non-volatile inorganic acids which are of a strength which can be maintained practically constant throughout the process, thereby eliminating the use of strong acids which must be subsequently diluted before distillation of the alcohol, and subsequently reconcentrated for reuse.

It will also be seen that the present process is a continuous process in which the strength of the acid catalyst, once established, remains practically constant, in which a high pressure of the gases is advantageously maintained as well as a high temperature during the catalytic conversion, and in which the steam required is supplied in admixture with propylene and with a relatively dilute catalyst under conditions coordinated as to temperature, pressure, ratio of steam to propylene, and strength of acid catalyst so that the alcohol can be continuously produced under uniform conditions maintained for long periods of time.

In carrying out the process the mixture of steam and propylene is advantageously preheated before bringing it into contact with the acid catalyst. When the admixed steam and propylene are heated to approximately the temperature of the acid before bringing them into contact with the acid, and when the acid has once been brought to the proper catalytic temperature, it can readily be maintained at that temperature, without dilution or concentration, and with the supply of only such heat as is lost or is not supplied by the heat of formation of the alcohol.

The carrying out of the process under a high pressure has the advantage, among others, over operating at atmospheric pressure, that a much smaller and more compact apparatus can be used, with a much more dilute acid catalyst, while nevertheless maintaining sufficiently high catalytic temperatures to effect formation of the isopropyl alcohol with the dilute acid catalyst.

This application is a continuation in part of my prior application Serial No. 547,452.

I claim:

1. The method of producing isopropyl alcohol in a continuous manner, which comprises forming a mixture of propylene with water vapor in regulated proportions, passing such mixture into intimate contact with a dilute non-volatile inorganic acid catalyst maintained at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

2. The method of producing isopropyl alcohol in a continuous manner, which comprises forming a mixture of propylene with water vapor in regulated proportions, passing such mixture into intimate contact with a dilute sulfuric acid catalyst maintained at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

3. The method of producing isopropyl alcohol in a continuous manner, which comprises forming a mixture of propylene with water vapor in regulated proportions, preheating said mixture to a temperature approaching that of the acid catalyst, passing such mixture into intimate contact with a dilute non-volatile inorganic acid catalyst maintained at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

4. The method of producing isopropyl alcohol in a continuous manner, which comprises forming a mixture of propylene with water vapor in regulated proportions and at a high pressure, passing such mixture into intimate contact with a dilute non-volatile inorganic acid catalyst maintained at a high pressure and at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

5. The method of producing isopropyl alcohol in a continuous manner, which comprises forming a mixture of propylene with water vapor in regulated proportions and at a high pressure, preheating said mixture to a temperature approaching that of the acid catalyst, passing such mixture into intimate contact with a dilute non-volatile inorganic acid catalyst maintained at a high pressure and at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

6. The method of producing isopropyl alcohol in a continuous manner, which comprises forming a mixture of propylene with water vapor in regulated proportions and at a high pressure, passing such mixture into intimate contact with a dilute non-volatile inorganic acid catalyst maintained at a pressure in excess of 100 pounds and at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

7. The method of producing isopropyl alcohol in a continuous manner, which comprises forming a mixture of propylene with water vapor in regulated proportions and at a high pressure, passing said mixture into intimate contact with a dilute non-volatile inorganic acid catalyst maintained at an effective and substantially uniform catalytic strength and a temperature in excess of about 170° C., cooling the resulting gases while maintaining the high pressure thereon to condense the alcohol therefrom, admixing additional water vapor with the remaining propylene while maintaining it at the high pressure, and passing the resulting mixture of propylene and water vapor, together with further additions of propylene, into intimate contact with such an acid catalyst while maintained under a high pressure to effect further formation of alcohol.

8. The method of producing isopropyl alcohol in a continuous manner, which comprises forming a mixture of propylene with water vapor in regulated proportions, passing such mixture into intimate contact with a dilute non-volatile inorganic acid catalyst maintained at an effective and substantially uniform catalytic strength and a temperature in excess of about 170° C., and supported on a carrier, and drawing off the resulting gases and vapors containing the vapors of the isopropyl alcohol and the excess propylene and steam and cooling the same to condense aqueous alcohol therefrom.

9. The method of producing isopropyl alcohol in a continuous manner, which comprises forming a mixture of propylene with water vapor in regulated proportions, passing such mixture into intimate contact with a dilute phosphoric acid catalyst maintained at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

10. The method of producing isopropyl alcohol in a continuous manner, which comprises forming a mixture of propylene with water vapor in regulated proportions, passing such mixture into intimate contact with a dilute sulfuric acid catalyst maintained at an effective and substantially uniform catalytic strength and a temperature in excess of about 170° C., and supported on a carrier, and drawing off the resulting gases and vapors containing the vapors of the isopropyl alcohol and the excess propylene and steam and cooling the same to condense aqueous alcohol therefrom.

11. The method of producing isopropyl alcohol in a continuous manner, which comprises forming a mixture of propylene with water vapor in regulated proportions, passing such mixture into intimate contact with a dilute phosphoric acid catalyst maintained at an effective and substantially uniform catalytic strength and a temperature in excess of about 170° C., and supported on a carrier, and drawing off the resulting gases and vapors containing the vapors of the isopropyl alcohol and the excess propylene and steam and cooling the same to condense aqueous alcohol therefrom.

12. The method of producing isopropyl alcohol in a continuous manner, which comprises forming a mixture of propylene with water vapor in regulated proportions, passing such mixture into intimate contact with a liquid body of dilute sulfuric acid catalyst maintained at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

13. The method of producing isopropyl alcohol in a continuous manner, which comprises forming a mixture of propylene with water vapor in regulated proportions, passing such mixture into intimate contact with a liquid body of dilute phosphoric acid catalyst maintained at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

14. The method of producing isopropyl alcohol in a continuous manner, which comprises forming a mixture of propylene with water vapor in regulated proportions, passing such mixture into intimate contact with a liquid body of dilute non-volatile inorganic acid catalyst maintained at an effective and substantially uniform catalytic strength and a temperature in excess of about 170° C., and drawing off the resulting gases and vapors containing the vapors of the isopropyl alcohol and the excess propylene and steam and cooling the same to condense aqueous alcohol therefrom.

15. The method of producing isopropyl alcohol in a continuous manner which comprises forming a mixture of propylene and water vapor in regulated proportions, passing such mixture into intimate contact with a dilute sulfuric acid catalyst maintained at a temperature in excess of about 200° C. and at a pressure in excess of about 600 pounds, and drawing off the resulting gases and vapors containing the vapors of the isopropyl alcohol and the excess hydrocarbon and steam and cooling the same to condense aqueous alcohol therefrom.

16. The method of producing isopropyl alcohol in a continuous manner which comprises forming a mixture of propylene and water vapor in regulated proportions, passing such mixture into intimate contact with a dilute sulfuric acid catalyst containing not more than about 27% sulfuric acid, maintained at a temperature in excess of about 170° C. and under a pressure in excess of about 200 pounds, and drawing off the resulting gases and vapors containing the vapors of the isopropyl alcohol and the excess hydrocarbon and steam and cooling the same to condense aqueous alcohol therefrom.

17. The method of producing isopropyl alcohol in a continuous manner which comprises forming a mixture of propylene and water vapor in regulated proportions, passing such mixture into intimate contact with a dilute sulfuric acid catalyst containing not more than about 5% sulfuric acid, maintained at a temperature in excess of about 190° C. and under a pressure in excess of about 600 pounds, and drawing off the resulting gases and vapors containing the vapors of the isopropyl alcohol and the excess hydrocarbon and steam and cooling the same to condense aqueous alcohol therefrom.

18. The method of producing isopropyl alcohol in a continuous manner which comprises forming a mixture of propylene and water vapor in proportions varying from 1½ parts of water vapor to 1 of propylene to 25 parts of water vapor to 75 parts of propylene, passing such mixture continuously into intimate contact with a dilute inorganic acid catalyst containing not more than about 27% of a non-volatile inorganic acid maintained at a temperature in excess of about 170° C. and under a pressure in excess of about 200 pounds, and drawing off the resulting gases and vapors containing the vapors of the isopropyl alcohol and the excess hydrocarbon and steam and cooling the same to condense aqueous alcohol therefrom.

FLOYD J. METZGER.